(No Model.) 5 Sheets—Sheet 2.

D. W. G. HUMPHREY.
BUTTON HOLE STITCHING MACHINE.

No. 291,736. Patented Jan. 8, 1884.

Witnesses:
Chas. S. Gooding.
T. W. Porter.

Inventor:
Daniel W. G. Humphrey
per Eugene Humphrey
Atty (No Model.) 5 Sheets—Sheet 3.
D. W. G. HUMPHREY.
BUTTON HOLE STITCHING MACHINE.

No. 291,736. Patented Jan. 8, 1884.

Witnesses.
Chas. S. Gooding
T. W. Porter

Inventor:
Daniel W. G. Humphrey
per Eugene Humphrey, Atty.

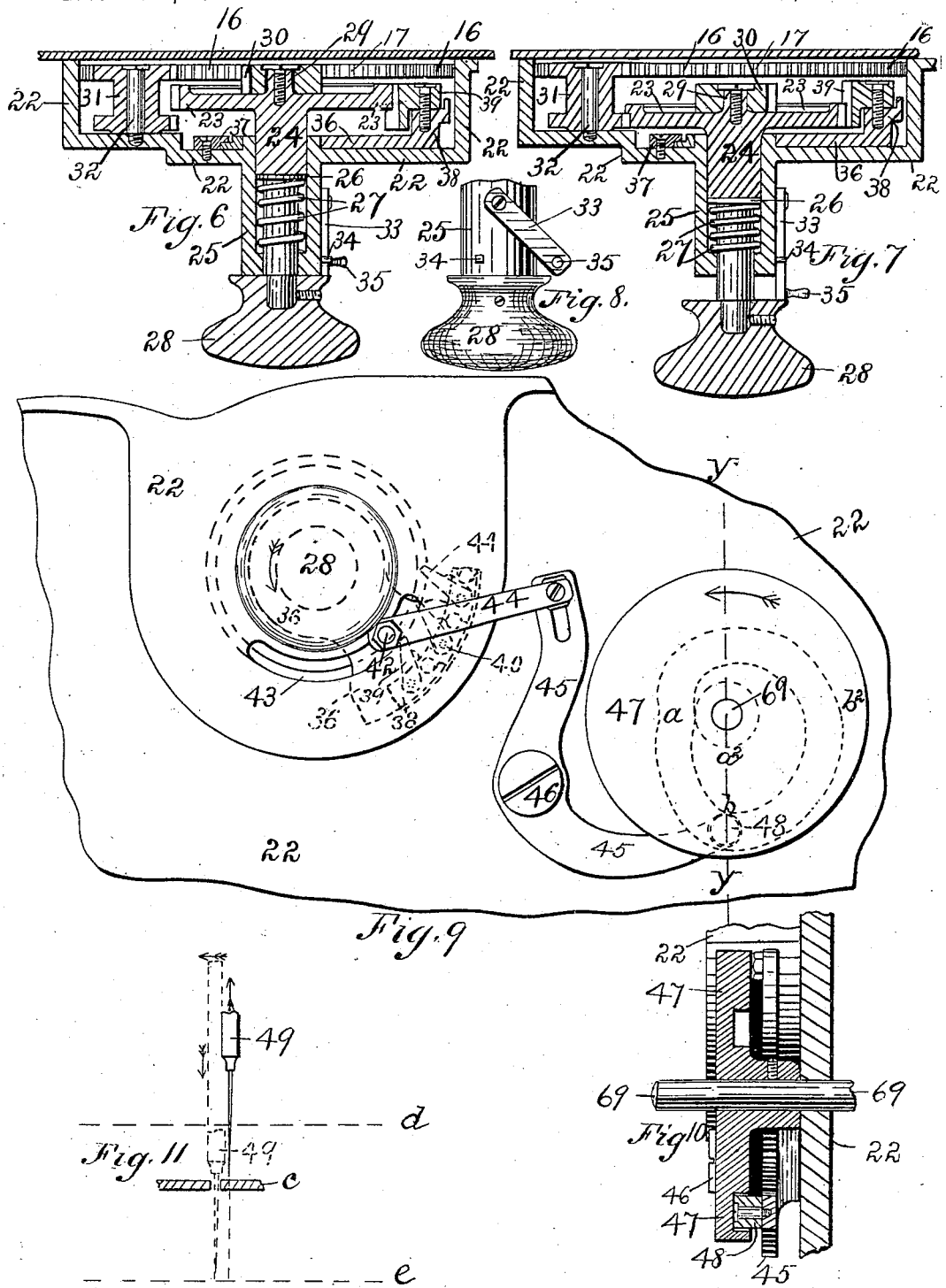

(No Model.)

D. W. G. HUMPHREY.
BUTTON HOLE STITCHING MACHINE.

No. 291,736. Patented Jan. 8, 1884.

5 Sheets—Sheet 5.

Witnesses:
Chas. S. Gooding
T. W. Porter

Inventor:
Daniel W. G. Humphrey
per Eugene Humphrey
Atty.

UNITED STATES PATENT OFFICE.

DANIEL W. G. HUMPHREY, OF CHELSEA, MASSACHUSETTS, ASSIGNOR TO THE RAPID BUTTON-HOLE MACHINE COMPANY.

BUTTON-HOLE STITCHING-MACHINE.

SPECIFICATION forming part of Letters Patent No. 291,736, dated January 8, 1884.

Application filed June 18, 1883. (No model.)

*To all whom it may concern:*

Be it known that I, DANIEL W. G. HUMPHREY, of Chelsea, in the county of Suffolk and State of Massachusetts, have invented new and useful Improvements in Button-Hole Stitching-Machines, which will, in connection with the accompanying drawings, be hereinafter fully described, and specifically defined in the appended claims.

My present invention relates to that class of button-hole stitching-machines for which I have obtained a number of patents, and is, in some particulars, an improvement upon the machine for which I received a patent dated February 27, 1883, and numbered 273,087. I employ substantially the same stitching devices, work-plates, and traveling cloth or feed clamp as are shown and described in said patent; but the underlying feed-wheel employed to impart the requisite movements to said clamp, the feed-movement imparted thereto, and the devices for actuating the feed-wheel are different, and, as hereinafter more fully and particularly set forth and claimed, constitute the chief features of my present invention, which further consists in a new construction, combination, and arrangement of the central work-plate and the underlying loop-spreaders attached thereto, as hereinafter described and claimed.

Figure 1:
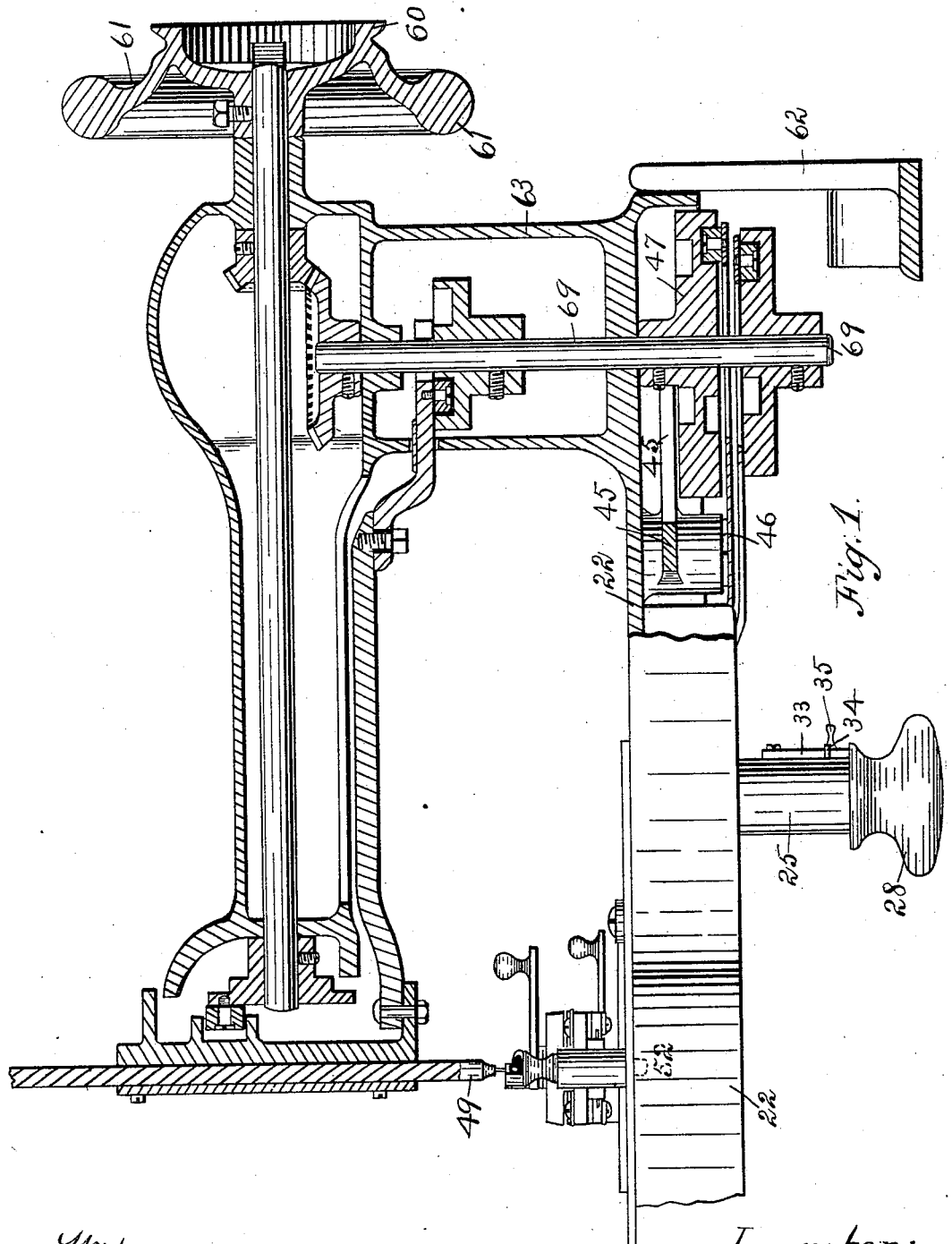
Figure 2:
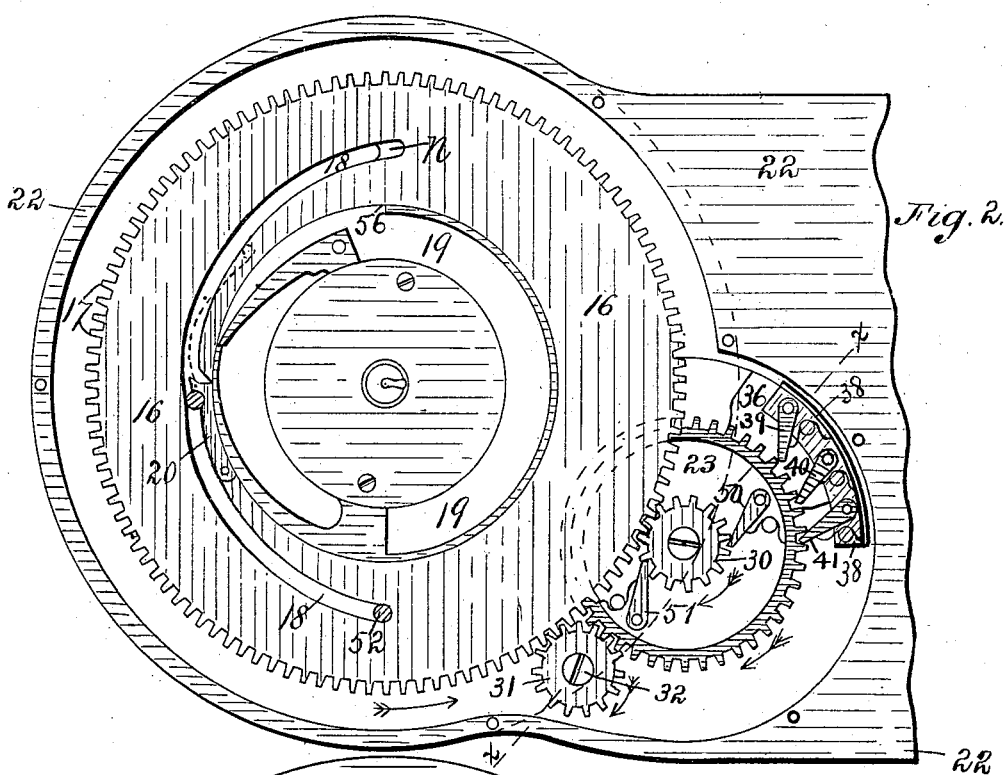
Figure 3:
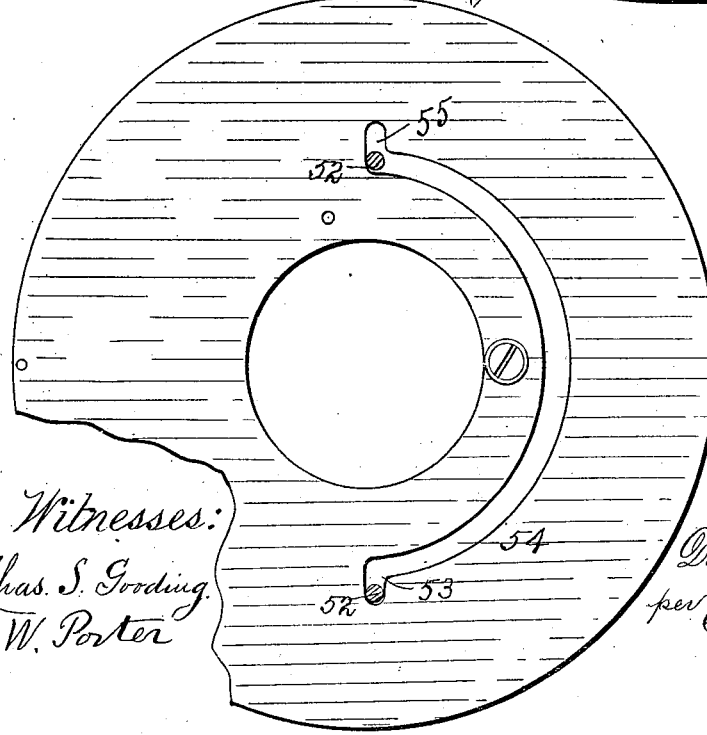
Figure 4:
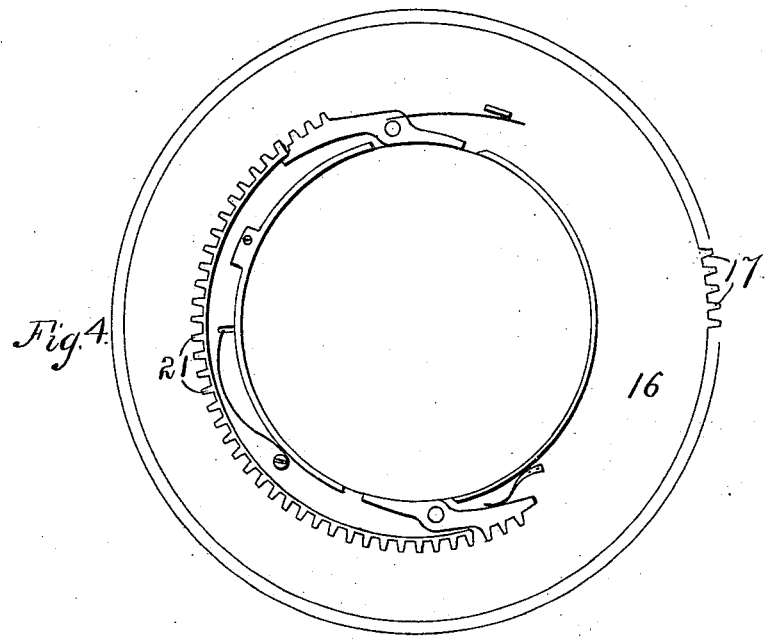
Figure 5:
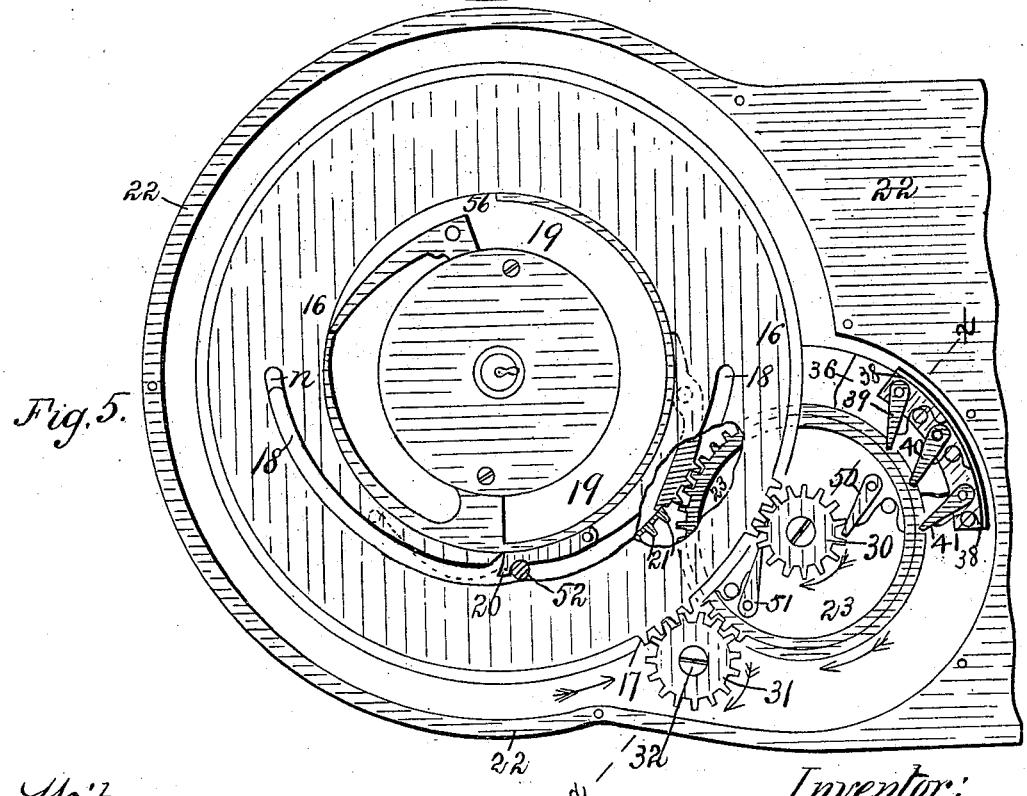
Figure 12:
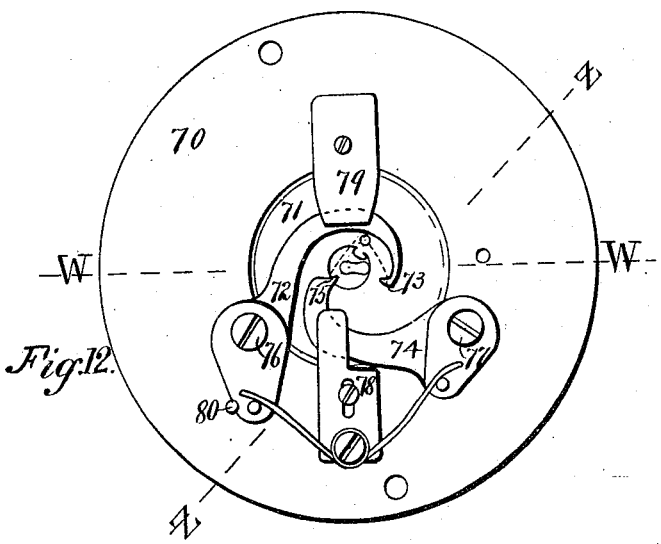
Figure 13:
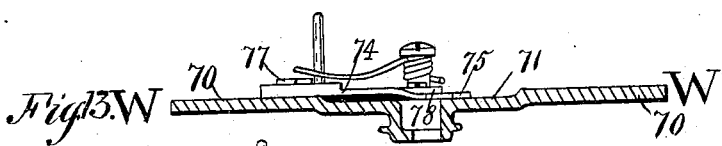
Figure 14:
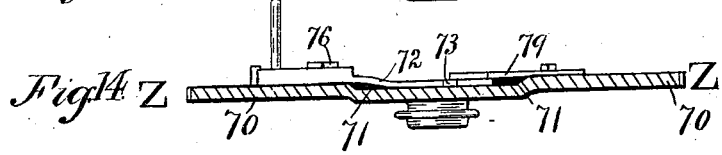
Figure 15:
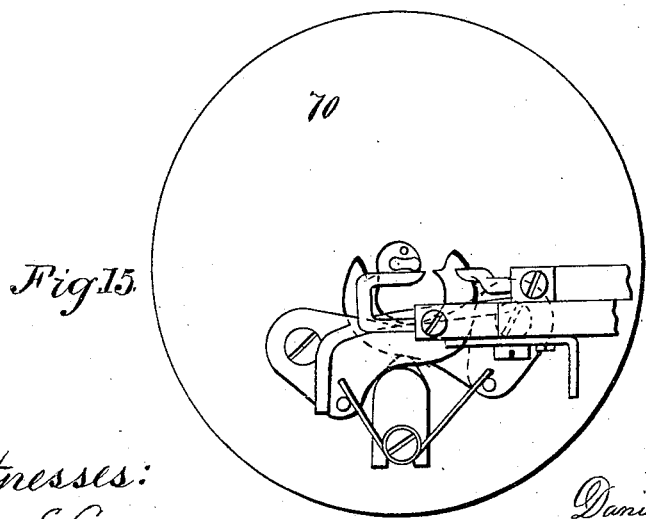

In the accompanying drawings, Figure 1 is a longitudinal vertical section taken centrally through the "goose-neck" of the machine, and extending downward through the rear portion of the bed, and the underlying devices attached to and actuated by the vertical shaft, while the cloth-clamp and forward portion of the bed are shown in elevation, the extreme front end of the machine-bed and work-plate being broken away, to economize room in drawing. Fig. 2 is a top view or plan of the front end of the machine-bed, with the grooved clamp-moving feed-wheel and its immediate actuating devices shown in their respective working positions in the recessed bed, and as disclosed by the removal of the plates which cover them by the removal of the plates which cover them when in use. Fig. 3 is a plan of the usual slotted work-plate, partially broken away to economize space in drawing, and shown as removed from Fig. 1, a small supplemental plate (not shown) being employed to cover that portion of the side recess and the devices contained therein which does not come within the scope of the larger circular plate. Fig. 4 is a plan of the under side of the feed-wheel, the upper side of which is shown in Fig. 2, fully showing the inner teeth thereon, formed on the arc of a circle, but omitting the surrounding peripheral teeth mostly, to save labor in drawing. Fig. 5 is a view similar to that in Fig. 2, but showing the feed-wheel as turned a quarter-revolution in the direction indicated by the arrow, as compared with its position in Fig. 2, and bringing it to that point where the partially-underlying large pinion engages the inner teeth upon the under side, which are shown as through a break in the wheel indicated in the drawing, the peripheral teeth in both the wheel and pinion being mostly omitted, to save labor in drawing. Fig. 6 is a vertical section taken as on line $xx$, Figs. 2 and 5, and as viewed from the right of said line. Fig. 7 is a view similar to that of Fig. 6, taken as upon the same line, but as when the large and small pinions have been depressed in their recess and locked down out of direct contact with the teeth of the feed-wheel, but in gear with an intermediate spool-shaped or double pinion at the left, as shown, such depression of the pinions being effected by means of the hand wheel or knob attached to the lower end of the spindle upon which the pinions are formed or secured, as shown, and for purposes hereinafter explained. Fig. 8 is a detached side elevation of the knob on the pinion spindle or arbor, and of a portion of the hub through which said shaft or arbor operates, viewed from the right of Figs. 6, 7, and showing as idle the locking device or latch which is shown in operation in Fig. 7. Fig. 9 is a detached under side view of the feed-cam, which is secured, when in working position, to the vertical shaft, as shown in Fig. 1, and as viewed when the machine is turned back upon its journal-stands, having the lower cam and devices, Fig. 1, removed from the shaft, and the lower groove in the feed-cam omitted, the upper groove employed to impart, through intermediate devices, the requisite movements to the pawls which engage the larger feed-pinion being shown by dotted lines, and also showing the lever actuated by said cam-groove, and the adjustable link by which said lever is attached to a stud projecting from the pawl-carrier down through a curved slot in the bed, whereby movement is transmitted from the feed-cam to the driving-pinions, as required. Fig. 10 is a vertical section of the feed-cam and its lever, taken as on line $y\ y$, Fig. 9, and viewed from the right of said line. Fig. 11 is merely an illustrative figure to aid in describing the feed movement relatively to the operations of the perforating-needle, as hereinafter referred to. Fig. 12 is an under side plan view of the central work-plate and the loop-spreading devices attached thereto, and as embodying my improvements therein. Fig. 13 is a vertical section taken through said plate as on line W W, Fig. 12, viewed as from above said line, and showing the spreader and other attachments secured to the plate below said line in elevation, while the other attachments to the plate are omitted. Fig. 14 is a vertical section taken as on line Z Z, Fig. 12, viewed as from the right, and showing the spreader and attachments to the left of said line in elevation, while the attachments shown in the preceding figure are omitted. Fig. 15 represents spreading devices as employed by me in a former patent, now introduced for purposes of illustration, by comparison, of my present improvements, as hereinafter stated.

There is nothing new in the devices shown above the machine-bed in Fig. 1, and in and of themselves they form no part of my present invention. The needle-bar has the usual four motions—namely, a vertical reciprocating movement and a lateral to-and-fro motion—carrying the upper or perforating needle alternately through the goods and over the edge thereof, through the button-hole, in an old and well-known manner. The "goods" (by which term I mean the materials of whatever kind in which the button-holes are stitched) are held in and moved by a traveling clamp fed along stitch by stitch, guided, as usual, by a slotted work-plate and actuated by a groove in a feed-wheel underlying such plate. The feed-wheel 16, Fig. 2, in its construction and the mode of operating the same, constitutes an essential feature in my present invention. Upon its periphery are formed a full circle of teeth, 17, and in its upper side is cut a groove, 18, composed of two intersecting curves. The wheel is centrally fitted to revolve in a horizontal plane around the large hub 19, formed upon and as a part of the machine-bed. When the wheel is placed upon the hub, as shown, the ends of groove 18 are diametrically distant from said hub or from the inner circumferential line of the wheel, about the length of the button-hole which the wheel is designed to feed. The groove through one of its component curves, or one-half its length from either end, gradually and uniformly approaches the hub, and then through the other half recedes therefrom in the same manner. The extent to which the groove thus approaches toward and recedes from the central hub is the full length of the longest button-hole which the wheel is adapted to feed. Shorter button-holes may be fed by the same wheel; but when the stitching is completed on such the wheel will not stand in right position to receive the clamp-pin when the clamp is swung around into position to commence another hole of the same length, and will therefore have to be turned by hand to bring it to the right place; but when a full-length button-hole is stitched, then the wheel will make a complete revolution in feeding the same, and leave off at the right position to commence another hole of the same length. The ends of said groove 18 terminate, practically, in a diametric line across said wheel and hub; but the back end, $n$, continues slightly beyond such line, and, as is usual, the depth of the groove to that extent is diminished, forming an incline from the lowest depth to the surface, in order to avoid a dead-lock with the clamp-pin, when the end of the groove is reached and its practical work ceases, should the movement of the wheel be continued in the same direction. The practical working scope of each curve or lineal half of this groove is confined to a quarter-turn of the wheel, and the construction and operation of the groove is precisely like that in the wheel shown and described in the patent issued to me October 7, 1862, in which the groove was repeated on the diametrically-opposite side of the center of the wheel, but the practical feeding operation of which was confined, as therein described, to one side, as in my present invention, the side so employed in said patent being also provided at the intersection of the curves constituting such groove with a sliding driver, corresponding to driver 20 in my present invention, and a recess in the collar or hub around which the driver and wheel revolved, to permit said driver to pass around the clamp-pin, corresponding to cut 56 in hub 19 in my present invention. Said driver 20 is pivoted in the usual manner to the wheel at the intersection of the curves composing the groove 18, and stands in the path of the groove, except when it is forced into cut 56 in passing the clamp-pin, as hereinafter described. A light spring is employed, as shown, to keep said driver from entering said cut and coming in contact with the abrupt end thereof when the wheel is being turned backward by hand, as hereinafter described. The groove 18 in the usual manner imparts movement to the clamp through a pin projecting downward from the clamp, through the guiding-slot in the work-plate, and into said groove, while the sides of the button-hole are being stitched; and the driver 20 turns said clamp while the circular end or eyelet part of the hole is being stitched, as will be explained. During the time the groove 18 is operating, as stated, the wheel is driven by its outer circle of peripheral teeth; but when the driver 20 is turning the clamp the wheel is moved by the teeth formed upon the arc of a circle within such outer circle, and is thereby moved more rapidly. Bed 22 is formed with a circular recess, of unequal depths, to receive and support said wheel with its upper face nearly flush with the upper surface of the bed while accommodating the inner teeth, formed upon the arc of a circle, 21, Fig. 4, on the under side of the wheel in a deeper channel; and the circular wall or rib which underlies and supports the wheel outside of the teeth 21 is cut through transversely, to allow the large driving-pinion 23, Figs. 2 and 5, to extend beneath the outer teeth and edge of the wheel into the path of teeth 21, so as to engage the same at intervals. The bed is also more deeply chambered beneath pinion 23, and formed to receive said pinion and the pawl-carrier for actuating the same, as shown in Figs. 6, 7, and to allow of a movement of said pinion vertically or transversely to the plane of the feed-wheel. In this deeper recess or chamber are located the immediate actuating devices through which all the requisite movements of the feed-wheel are effected.

Pinion 23, Fig. 6, is formed with a central spindle or arbor, 24, fitted to rotate and to be moved vertically in a hub, 25, formed upon the under side of the machine-bed. A portion of said arbor is diminished, as shown, to receive a washer, 26, and spiral spring 27, which uphold the same within said hub, and upon the lower end of the arbor is secured by a set-screw a knob, 28. This knob is also upheld against the lower end of hub 25 by the expansive force of spring 27, and serves to counteract said force and limit the upward movement of arbor 24 by said spring to the plane of the teeth upon the under side of the feed-wheel, with which it engages at intervals, as stated, and said knob also serves to restrain, by its frictional contact with said hub under such spring-pressure, the pinion from rotary movement, except such as is positively imparted thereto by its pawl mechanism, and as a handle by which the operator may depress the pinion and turn the same, for the purpose hereinafter stated.

Upon the upper side of pinion 23 there is formed a central boss or bearing, 29, whose axis is coincident with that of arbor 24, and upon this bearing is mounted a smaller pinion, 30, fitted to revolve freely thereon, and secured in place by an end screw having an overlapping head, and threaded in said boss, as shown. These are the regular driving-pinions for actuating the feed-wheel, the larger pinion, 23, operating at intervals in the segmentary teeth on the under side of the wheel always as a driver, while the smaller pinion, 30, except when depressed as hereinafter explained, is engaged all the time with the outer circle of peripheral teeth, operating therein part of the time as a driver, and being at other times driven by the feed-wheel, as will be explained.

A spool-shaped double pinion, 31, of the same diameter as pinion 30, is mounted on a screw-stud, 32, so as to revolve freely thereon, and, like pinion 30, is constantly in gear with the peripheral teeth of the feed-wheel; and it is so formed and arranged relatively to pinion 23 that the teeth of the latter revolve freely in the space between its two ends, except when pinion 23 is depressed and brought into gear with its lower end, as shown in Fig. 7. When pinions 23 and 30 are thus depressed and withdrawn from contact with the teeth on the feed-wheel, and pinion 23 is thus brought into gear with the lower set of teeth on pinion 31, the latter pinion then serves as an intermediate between pinion 23 and the feed-wheel, when, by turning knob 28 to move pinion 23 in the same direction that its pawls move it, the operator is enabled to reverse the movement of the feed-wheel; and this is the sole function of pinion 31, and the object of arranging pinions 23 and 30 to be so depressed. At no other time are said pinions 23 and 31 engaged with each other, and at all other times the latter is driven by the feed-wheel as an idler. The feed-wheel and pinions invariably move in the direction indicated by their respective arrows in Figs. 2 and 5, except in the case of a hand movement, as above explained, when the pinion 31 and feed-wheel 16 move in the reverse direction to that indicated by their arrows. When pinions 23 and 30 are thus depressed and turned by the hand of the operator, the expansive force of spring 27 has to be overcome; and to relieve the hand of the operator from this force while turning the knob to move the feed-wheel backward, a latch, 33, is pivoted to hub 25, and hangs obliquely over the projecting rim of the knob, as shown in Fig. 8, until the knob and spindle are drawn down, as shown in Fig. 7, when, being freely pivoted, it gravitates into a vertical position, with its side resting against stop 34, and its lower end bearing upon the projecting edge or rim of the knob, thereby locking the parts attached to the knob in their depressed position. The stop 34 prevents the latch from being swung out of place by the friction of the knob on its lower end when turned to rotate the pinions for the purpose stated; and for convenience in releasing the parts from their depressed position the latch is provided with a thumb-piece, 35, by which the operator readily presses the latch aside, when the depressed parts are quickly raised by the expansive force of the spring into their working positions.

In addition to the restraining friction between the hand-knob 28 and hub 25 to hold pinion 23 in place, as stated, it will be necessary to hold the feed-wheel by a constant friction device, which may be applied thereto by a friction-block arranged to act under spring-pressure against the wheel through the bed of the machine, as is usual, or in any other convenient manner. Hub 25 projects upward into the pinion recess or chamber, and upon that portion of it is fitted a pawl-carrier, 36, having a rotary reciprocating movement in a horizontal direction; and said carrier is secured from displacement, when the machine is turned back or by any other cause, by a button, 37, screwed down to the bed and overlapping the carrier on one side of the hub, as shown in Figs. 6 and 7. On the opposite side of the hub the carrier extends beyond the periphery of the pinion 23, and has formed upon it a raised rim, 38, to which are pivoted the pawls 39 40 41, for actuating said pinion by engaging its peripheral teeth. (See also Figs. 2, 5, 9.) These pawls are made of sufficient depth to maintain their proper contact with the teeth on pinion 23, when the same is depressed, as before stated, and as shown in Fig. 7, and are consequently never displaced by such vertical movement of the pinion. The pawls are formed and arranged to operate against the teeth of pinion 23 in the usual manner, and the carrier to which they are attached turns upon the same axis as said pinion, and has a rotary reciprocating movement imparted to it in a horizontal plane through a stud, 42, Fig. 9, projecting downward therefrom through a circular slot, 43, in the bed, which stud is pivotally connected with bar 44, adjustably connected at its opposite end with lever 45, which is pivoted to the under side of the bed at 46, and rocked on said pivot by feed-cam 47, which is secured to the vertical shaft 69, Fig. 1. This feed-cam is grooved upon both the upper and under side, the under groove serving to operate the under-needle bar, and the upper groove operates the feed-wheel through the intermediate devices described.

In Fig. 9 the under side of the cam is shown with the under groove omitted and the devices below it on the vertical shaft removed, and as it would appear under such conditions when the machine was turned back upon its journal-stands, the feed-groove cut in its upper side being indicated by dotted lines, and in the position relatively to lever 45 of having just completed a feed movement. The points at which the movement of lever 45 is reversed by said cam-groove are indicated by letters $a$ and $b$. Starting with cam-roll 48 on said lever in that part of the groove marked $a$, (standing, as it then would, at $a^2$, and $b$ at $b^2$,) three-quarters of the revolution of the cam 47 in the direction indicated by the arrow thereon would bring the roll 48 out to $b$, as shown, during which time a continuous movement of the feed-wheel would be effected through the said intermediate devices, and while the perforating-needle would be working above the goods and in the button-hole and below the goods. Another quarter-revolution of the cam in the same direction would bring $a$ to the position of $a^2$, and the roll 48 into the same position, thereby imparting a reverse movement to the feed-pawls, to renew their hold upon the teeth of pinion 23 for another forward movement. During this backward movement of the feed-pawls and rest of the feed-wheel, the said perforating-needle is working through and below the goods, as will be further explained. This manner of feeding keeps the feed-wheel and clamp in motion all the time that the perforating-needle is not in the goods, and is a new and essential feature in my present invention, as I derive a great advantage therefrom not heretofore attained in such machines, being thereby enabled to very largely increase the speed of the machine and practically to perform a very much greater amount of work therewith in a given time.

In further explanation and illustration of this part of my invention I refer in this connection to Fig. 11, in which a detached portion of the needle-bar 49 is represented with its needle just rising out of the edge of a piece of goods, $c$, in which a button-hole is being stitched, (shown in cross-section.) The upper broken line, $d$, represents the extreme height to which the point of the needle would rise while so stitching a button-hole, and the lower line, $e$, the extreme depth to which the needle-point would descend. The needle having the usual four motions rises out of the goods to line $d$, moves over laterally, as indicated, descends through the button-hole to line $e$, and then retraces the movements, passing down through the goods again. Heretofore in this class of machines it has been considered practicable to feed the clamp only during the time the needle is in motion or working above the level of the goods, and has been the practice to feed the clamp twice between stitches—once during the time the needle is rising from the goods and passing over and descending to the button-hole slit, and again when the needle is rising from the slit with its point above the level of the goods and until it descends again to the goods—in other words, while the needle is in motion between lines $c$ and $d$—thus dividing the feeding into two abrupt movements, stopping and starting the wheel and clamp so frequently as to render it impracticable to operate the machine at a very high rate of speed. I have discovered and demonstrated that it is practicable to feed the clamp by keeping the feed-wheel in motion all the time while the needle is rising above the goods, as from $c$ to $d$, while it is moving over laterally and descending through the button-hole to the lowest depth $e$, and while it is rising again to $d$, and moving over laterally and descending to $c$, ceasing only while the needle passes into and through the goods and remains in the same, during which time the feed-pawls renew their hold upon the driving-pinion, as before described. This mode of feeding is such a practical relief to the machine that I am enabled to nearly double the usual speed at which such machines are run.

I will now explain the operation of wheel 16 and its actuating-pinions. The pinions 23 and 30 have a common axis, pinion 30 being mounted upon pinion 23, so that at times it may rotate freely and independently of the movement of the latter pinion. Pinion 23, Figs. 2, 5, partially underlies the feed-wheel, as before stated, and is actuated by pawls 39 40 41 always in the direction of the indicating-arrow. It also serves as the pawl-carrier for pinion 30, which, when not idling, is moved coincidently with the movement of pinion 23 by the pawls 50 and 51, pivoted thereto, and provided with springs to effect the interlocking of the same with the teeth of pinion 30, when the same is driving the feed-wheel. When the larger pinion, 23, engages the inner segmentary teeth, as shown in Fig. 5, it moves the wheel faster than when moved by pinion 30, and consequently during that time pinion 30 ceases to drive and becomes driven by the feed-wheel revolving at a higher rate of speed than its pawl-carrying pinion 23 is moving, and when a half-revolution of the feed-wheel has been so completed then pinion 23 ceases to drive, being again out of gear with the under teeth, and pinion 30 resumes its driving function, being engaged by pawls 50 and 51, and revolved at the same speed as the pawl-carrying pinion 23 moves. During these movements of pinions 23 and 30, just described, the double pinion 31 is revolved by the feed-wheel as an idler, and, as before stated, it performs no practical function except to reverse the movement of the feed-wheel when the other pinions are depressed, and pinion 23 is engaged with the lower set of teeth thereon, as before described, such reversing movement being convenient and necessary to avoid turning the feed-wheel nearly an entire revolution when only a slight movement backward and replacing of the clamp is required for any purpose.

Groove 18 in wheel 16 may be adapted to feed button-holes of any desired length, so that when a button-hole of such length is stitched one complete revolution of the wheel will be made, leaving off with its groove in position relatively to the slotted work-plate to receive the clamp-pin through said slot, and commence feeding another hole of the same length. To adapt the wheel to other fixed lengths of button-holes to be completed, as stated, by one revolution of the wheel, certain modifications will be required—namely, the distance diametrically between the ends of groove 18 will be more or less, according to the length of button-hole for which it is so adapted, and the curvature of the groove will need to be modified accordingly, and the diameter of the wheel and the number of its peripheral teeth, as well as that of its driving-pinion 30, will have to be varied; but no change in the inner teeth and larger driving-pinion will be required. Consequently for each change of length of button-holes to be stitched at one complete revolution of the wheel—as for overcoats, vests, and button-boots—a change of wheels 16 and pinions 30, modified as stated, will be required, and sets of said wheels and pinions may be furnished with a machine, adapting it to so feed all the usual practical lengths of button-holes, which may be placed in working position with very little delay and trouble, as no nice adjustment is required, and with practical advantages over the more complicated mechanisms required to work out the same results with a single wheel. The wheel represented in the drawings is adapted to the short button-holes—about nine-sixteenths of an inch in length—made in "button-boots," and the number of peripheral teeth in such wheel, when full size, is about one hundred and ten, and in the smaller driving-pinion, which engages said teeth, there are about eighteen teeth, while the teeth formed upon the arc of a circle on the under side of the wheel, and which, as stated, require no change, contain, theoretically, the same number as their driving-pinion 23—namely, forty-two teeth each; but, practically, to secure uniformly nice spacing around the eyelet part of the button-hole, I have found it desirable to give more clearance to the teeth when they engage and disengage at the extremities of the semicircle, and this object I accomplish by reducing the number of said segmentary teeth to forty; and for the purpose of easing the initial contact of said teeth with their driving-pinion, when engagement takes place between them at intervals, as described, and to avoid any shock which might arise from a slight relative displacement of the two sets of teeth when so coming together, I employ the yielding teeth formed upon a separate plate, and pivoted to the wheel and held in position by springs, as shown in Fig. 4.

The practical operation of feed-wheel 16 and its driving-pinions 23 and 30, in moving the clamp and its goods in which the button-hole is being stitched, is as follows: The clamp-pin 52 projects, as usual, down through the end 53 of the slotted work-plate and into groove 18 of the feed-wheel, as indicated in Figs. 2 and 3. Pinion 23, not now in contact with the segmentary teeth on the under side of the wheel, is set in motion by its pawl mechanism, and serves as the carrier of pawls 50 and 51, which interlock with the teeth of pinion 30, and thereby impart the movement to that pinion, which, being in gear with the peripheral teeth of the feed-wheel, transmits the movement to said wheel.

This movement of the feed-wheel is so continued intermittingly, in the usual manner of such feed movements, until a quarter-revolution of the wheel is completed, during which movement the groove 18 will have carried the pin 52 into the position in front of driver 20, as shown in Fig. 5, and one side of the button-hole will have been stitched. Now pinion 23 comes into timely engagement with the inner segmentary teeth, as shown, and becomes the driver of the wheel at about three times the speed which it has thus far been driven by pinion 30, which now revolves idly. This movement is continued intermittingly until an additional half-revolution of the wheel is so completed, during which movement the driver 20 will have carried the clamp-pin 52 around to the entrance of the straight part 55 of the slot, Fig. 3, when the driver will be forced, by contact of the pin with the side of said slot, to retreat into notch 56, Fig. 2, to pass said pin. During this movement of the pin through the curved part 54 of the slot the eyelet end of the button-hole will have been stitched. Pinion 23 having now become disengaged from the segmentary teeth and ceased to be the direct driver of the feed-wheel, it acts again upon pinion 30 through pawls 50 and 51, causing it to resume its driving function in the peripheral teeth of the wheel, which is continued, as before, until the wheel has completed its last quarter-revolution, during which movement the other half of groove 18 will have carried the clamp-pin to the outer end of slot 55, and the last side of the button-hole will have been stitched. The wheel now stands in the right position to commence the feeding of another button-hole of the same length, when the clamp may be swung around into the starting position again.

My present improvements in the spreading devices consist in recessing plate 70 at 71, and so forming the spreaders 72 and 74 that their loop-engaging points 73 and 75, Fig. 12 will work close up to the bottom of said recess, thus enabling me to use a shorter needle than has been heretofore used in such machines. Needles of the usual length employed in such button-hole machines, when run at the greatly-increased speed which my present machine is capable of, are liable to vibrate, and thereby vary the distance between the perforations of the same in the goods, while a shorter needle, such as my improved spreading devices enable me to employ, is free from such objectionable vibratory action and effects.

In Letters Patent No. 273,087, granted to me February 27, 1883, I employed spreading devices such as are shown in Fig. 15 of the accompanying drawings, now introduced merely for the purpose of more clearly illustrating, by comparison, my present improvements. Said former spreaders were secured to the under side of the central work-plate, which was not recessed, and were arranged across each other and pivoted to the plate, as shown in Fig. 15. The function of my present spreaders and the means by which they are actuated are the same as described in said patent; but their construction, arrangement, and combination with said plate is different, whereby I secure the object stated. Spreader 72 is pivoted through its thicker part to the under side of plate 70 at 76, Fig. 12, outside the recess 71, while its thinner loop-engaging point 73 is offset, so as to closely underlie the bottom of said recess, as shown in Fig. 14, and when performing its office of opening or spreading the loop of thread its point 73 moves along the path indicated by the broken line extending therefrom, Fig. 12, and to about that extent. For security an overlapping plate, 79, is employed to keep said spreader from springing or working away from the bottom of said recess, and a stop, 80, serves as a rest for the spring-actuated arm of the spreader, when in the position shown, and not being operated by the looper-bar which actuates it when spreading the loop. Spreader 74 is also pivoted through its thicker part to the plate at 77, and offset, so that its point 75 works closely up under the bottom of the recess 71, as shown in Fig. 13, and when actuated by the under-needle bar, which operates it to spread the loop, it moves along the path indicated by the broken line extending therefrom in Fig. 12, and when not so actuated it rests, under spring-pressure, in the position shown, against the shoulder of its overlapping supporting-plate 78. By thus arranging the spreaders to work in a recess in the plate I am enabled to also work the under needle and looper-point closer to the plate, and consequently to use a considerably shorter perforating-needle, with the advantages above stated.

I claim as my invention—

1. In a button-hole stitching-machine, a slotted work-plate, a cloth holding and feeding clamp, and a feed-wheel having a double feeding-groove, a pivoted driver and two concentric sets of teeth, the outer set forming a complete circle and the inner set an arc of a circle only, combined with a recessed hub, around which said feed-wheel may rotate, and mechanism for imparting an intermittent rotary motion to said feed-wheel, substantially as described.

2. A slotted work-plate, a cloth holding and feeding clamp, and a feed-wheel having a feeding-groove and two concentric sets of teeth, as described, combined with two driving-pinions of unequal diameters, mounted on a common axis, the smaller pinion being connected with the larger pinion, but adapted to rotate independently thereof in one direction, and a driving mechanism constructed to operate the larger pinion directly and the smaller pinion indirectly through its connection with the larger pinion, substantially as described.

3. A slotted work-plate and a cloth holding and feeding clamp, combined with a feed-wheel adapted to operate said clamp, said feed-wheel being provided with two concentric sets of teeth, as described, the inner set forming an arc which is provided with yielding teeth at both ends, substantially as set forth.

4. Feed-wheel 16, having two sets of teeth, as described, in combination with two pinions of unequal diameters, having a common axis rotated at a uniform speed, and respectively engaging the teeth of the feed-wheel, as specified, and so arranged that the smaller pinion, when operative as the driver of the wheel, is actuated through a pawl mechanism carried by the larger pinion, substantially as specified.

5. In combination, feed-wheel 16, pinions 23 and 30, mounted upon a common axis, and having a capability of movement transverse to the plane of said wheel, and pinion 31, provided with two sets of teeth, and arranged to be driven at times by said wheel as an idler, and at times to serve as an intermediate between pinion 23 and wheel 16 to reverse said wheel, substantially as specified.

6. Pinions 23 and 30, mounted upon a spindle or arbor, 24, journaled in the machine-bed, spring 27, arranged to uphold said arbor and pinions, and knob 28, attached to the end of said arbor, whereby said pinions may be depressed by the hand of the operator to disengage them from the feed-wheel and engage them with the intermediate pinion, and be turned to reverse or move said wheel backward, as and for the purposes specified.

7. In a button-hole stitching-machine, a needle-bar and mechanism for reciprocating the same vertically and horizontally, combined with a traveling cloth-clamp and means for moving the said cloth-clamp continuously forward during a period of time greater than that occupied by the needle-bar in making one complete vertical reciprocation, substantially as described.

8. In a button-hole stitching-machine, a needle-bar and mechanism for reciprocating the same vertically and horizontally, combined with a traveling cloth-clamp and means for moving the said clamp continuously forward during a period of time approximately equal to three-fourths of the time occupied by the needle in making two complete vertical reciprocations, substantially as hereinbefore set forth.

9. The combination of the hub 25, pinion-arbor 24, spring 27, and hand-knob 28, with a gravitating latch adapted to fall into its operative position automatically when said knob is depressed, substantially as set forth.

10. The combination of the hub 25, pinion-arbor 24, spring 27, and hand-knob 28, with a gravitating latch adapted to fall into its operative position automatically when said knob is depressed, and a stop for limiting the movement of the said latch, substantially as described.

11. The work-plate 70, formed with a recess, 71, and the spreaders 72 and 74, pivoted to said work-plate, and having their loop-spreading points arranged within said recess, in combination with an under needle and looper, substantially as described.

12. The work-plate 70, having the recess 71, the pivoted spreaders 72 and 74, having offset spreading-points arranged within said recess close against the under side of said workplate, combined with an under needle and looper, substantially as described.

13. The work-plate 70, having the recess 71, the pivoted spreaders 72 and 74, having spreading-points arranged in the said recess, and the upholding-plates 78 and 79, for sustaining said spreaders, combined with an under needle and looper, substantially as described.

DANIEL W. G. HUMPHREY.

Witnesses:
EBEN HUTCHINSON,
T. W. PORTER.